US012561523B2

(12) United States Patent
Yano et al.

(10) Patent No.: US 12,561,523 B2
(45) Date of Patent: Feb. 24, 2026

(54) INFORMATION PROCESSING DEVICE, INFORMATION PROCESSING METHOD, AND RECORDING MEDIUM

(71) Applicant: NEC Corporation, Tokyo (JP)

(72) Inventors: Taro Yano, Tokyo (JP); Kunihiro Takeoka, Tokyo (JP); Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 18/286,287

(22) PCT Filed: Apr. 28, 2023

(86) PCT No.: PCT/JP2023/016881
§ 371 (c)(1),
(2) Date: Oct. 10, 2023

(87) PCT Pub. No.: WO2024/224604
PCT Pub. Date: Oct. 31, 2024

(65) Prior Publication Data
US 2025/0086388 A1     Mar. 13, 2025

(51) Int. Cl.
*G06F 40/279*      (2020.01)
*G06F 16/353*      (2025.01)
*G06F 18/24*       (2023.01)

(52) U.S. Cl.
CPC ................................. *G06F 40/279* (2020.01)

(58) Field of Classification Search
CPC ........ G06F 16/35; G06F 16/353; G06F 18/24; G06F 40/279; G06F 40/284; G06F 40/289; G06F 40/30
(Continued)

(56) References Cited

U.S. PATENT DOCUMENTS 5,371,807 A * 12/1994 Register ................ G06F 40/253
704/9
5,463,773 A * 10/1995 Sakakibara ......... G06F 16/3347
382/226
(Continued)

FOREIGN PATENT DOCUMENTS

JP      H05-324726 A      12/1993
JP      2010-040020 A      2/2010
(Continued)

OTHER PUBLICATIONS

International Search Report for PCT Application No. PCT/JP2023/016881, mailed on Jul. 25, 2023.
(Continued)

*Primary Examiner* — Martin Lerner
(74) *Attorney, Agent, or Firm* — Sughrue Mion, PLLC

(57)            ABSTRACT

In an information processing device, the class acquisition means acquires multiple classes to which target data is classified. The candidate set generation means generates a keyword candidate set which is a set of keyword candidates corresponding to each class. The keyword set generation means generates a keyword set corresponding to each class, from the keyword candidate set corresponding to each class, based on a relationship between the keywords included in the keyword candidate sets using a learned optimization model for decision making in text classification.

7 Claims, 16 Drawing Sheets

(58) Field of Classification Search
USPC ............................ 704/1, 9, 10; 707/737, 738
See application file for complete search history.

(56) References Cited

U.S. PATENT DOCUMENTS

| | | | | |
|---|---|---|---|---|
| 5,619,410 | A * | 4/1997 | Emori ................... | G06F 40/247 |
| | | | | 704/7 |
| 6,128,613 | A * | 10/2000 | Wong ................... | G06F 16/353 |
| | | | | 707/752 |
| 2008/0310687 | A1 * | 12/2008 | Hua ................... | G06V 10/7715 |
| | | | | 382/118 |
| 2010/0161406 | A1 * | 6/2010 | Narayan Vedam .... | G06Q 30/02 |
| | | | | 706/12 |
| 2010/0280981 | A1 | 11/2010 | Kato et al. | |
| 2010/0325109 | A1 * | 12/2010 | Bai ................... | G06F 16/3347 |
| | | | | 707/737 |
| 2018/0040035 | A1 * | 2/2018 | Qi ................... | G06Q 30/0275 |
| 2019/0303727 | A1 * | 10/2019 | Foroughi ............. | G06F 40/284 |
| 2020/0273069 | A1 * | 8/2020 | Palaic ................... | G06F 40/279 |

| | | | | |
|---|---|---|---|---|
| 2021/0271990 | A1 * | 9/2021 | Isezaki ................... | G06F 16/00 |
| 2023/0009197 | A1 * | 1/2023 | Seneger ................ | G06F 16/335 |
| 2024/0104119 | A1 * | 3/2024 | Oyamada ............. | G06F 16/285 |

FOREIGN PATENT DOCUMENTS

| | | |
|---|---|---|
| JP | 2011-090447 A | 5/2011 |
| WO | 2009/087757 A1 | 7/2009 |

OTHER PUBLICATIONS

Wenpeng Yin et al., "Benchmarking Zero-shot Text Classification: Datasets, Evaluation and Entailment Approach", Cognitive Computation Group, Department of Computer and Information Science, University of Pennsylvania, Aug. 31, 2019, 10 pages total.
Shengding Hu et al., "Knowledgeable Prompt-tuning: Incorporating Knowledge into Prompt Verbalizer for Text Classification", Dep. of Comp. Sc. & Tech., Institute for AI, Tsinghua University, Beijing, China et al., Mar. 18, 2022, 16 pages total.

* cited by examiner

TARGET DATA
(TEXT DATA)
(EX.) "THE WORLD COMPETITION
OF BASEBALL WAS HELD"

TEXT CLASSIFICATION
DEVICE
100

CLASSIFICATION
RESULT (EX.)
Politics
Sports
Science/Technology

100

12  IF

13  PROCESSOR

14  MEMORY

15  RECORDING MEDIUM

16  DB

17  DISPLAY UNIT

18  INPUT UNIT

Figure 3:
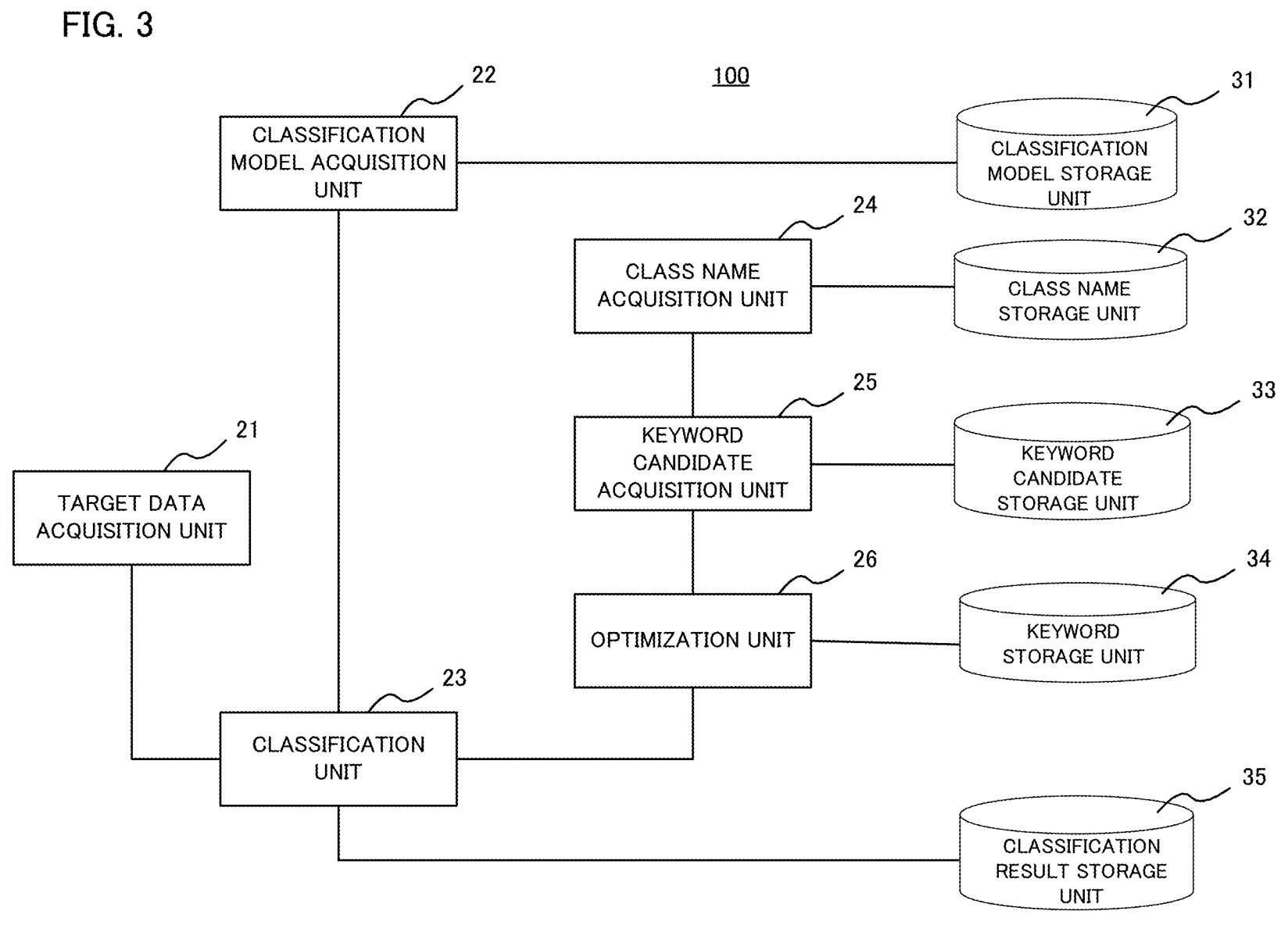

CLASSIFICATION MODEL STORAGE UNIT — 31

CLASS NAME STORAGE UNIT — 32

KEYWORD CANDIDATE STORAGE UNIT — 33

KEYWORD STORAGE UNIT — 34

CLASSIFICATION RESULT STORAGE UNIT — 35

CLASS NAME ACQUISITION UNIT — 24

KEYWORD CANDIDATE ACQUISITION UNIT — 25

OPTIMIZATION UNIT — 26

CLASSIFICATION MODEL ACQUISITION UNIT — 22

CLASSIFICATION UNIT — 23

TARGET DATA ACQUISITION UNIT — 21

FIG. 4

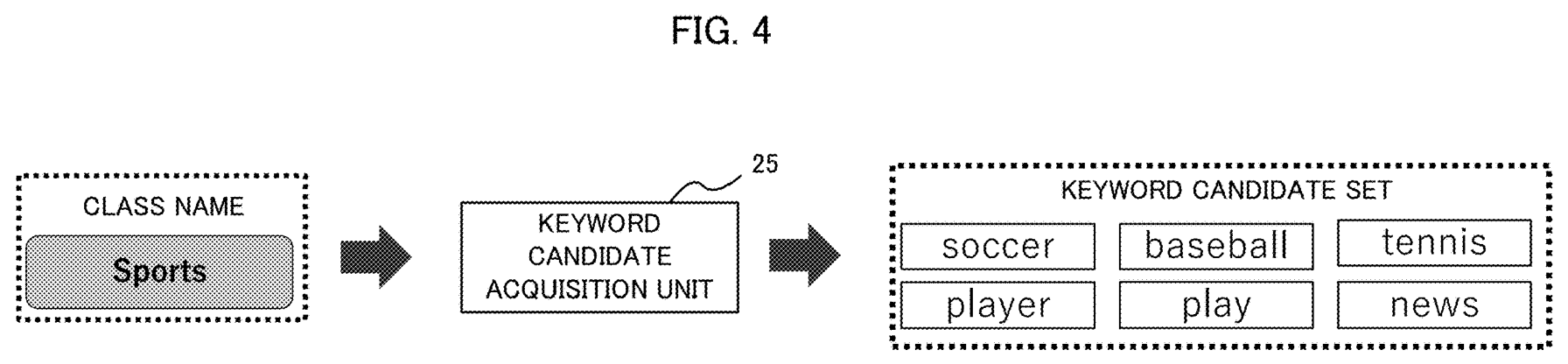

CLASS NAME

Sports

25

KEYWORD CANDIDATE ACQUISITION UNIT

KEYWORD CANDIDATE SET

| soccer | baseball | tennis |
| player | play | news |

| | Sports | Science | Music |
|---|---|---|---|
| 1 | (2) soccer | (1) math | (3) jazz |
| 2 | (4) baseball | (5) or (6) | (5) or (6) |
| 3 | (7) or (8) or (9) | (7) or (8) or (9) | (7) or (8) or (9) |
| ⋮ | ⋮ | ⋮ | ⋮ |
| m | | | |

ORDER OF DETERMINATION : (1),(2),...

FIG. 10

| | Sports | Science | Music |
|---|---|---|---|
| 1 | (2) soccer | (1) math | |
| 2 | (3) baseball | | |
| 3 | (4) golf | | |
| . . . . . | | | |
| m | | | |

ORDER OF DETERMINATION : (1),(2),...

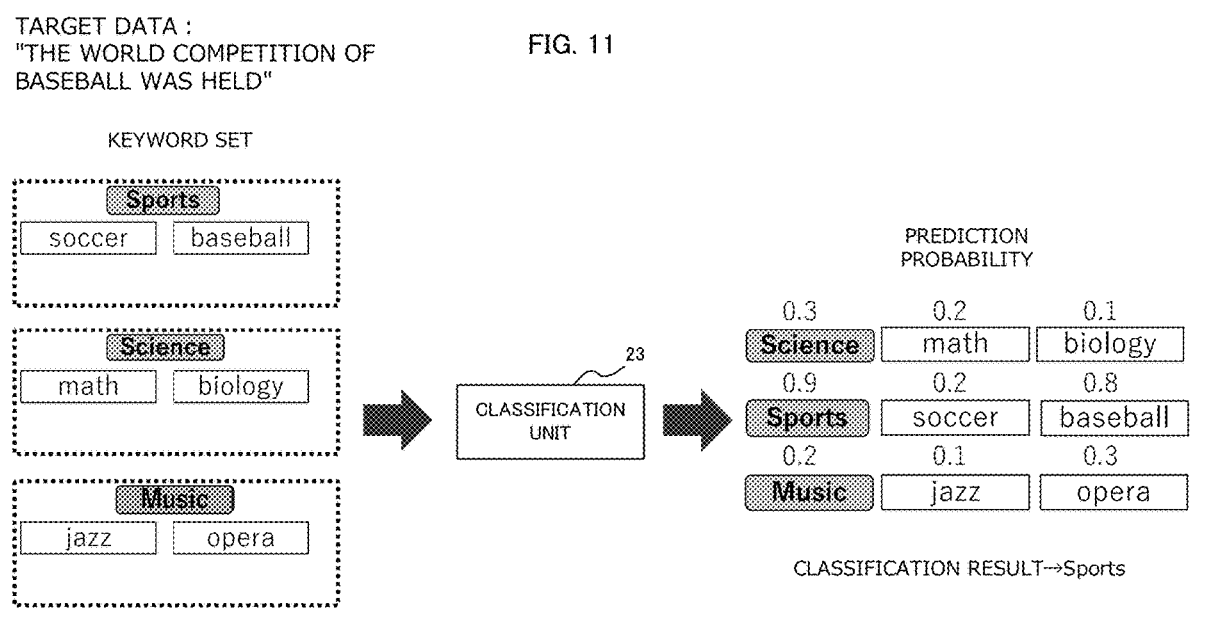

TARGET DATA :
"THE WORLD COMPETITION OF
BASEBALL WAS HELD"

FIG. 11

KEYWORD SET

```
┌·······························┐
:        Sports               :
:  ┌─────────┬──────────┐      :
:  │ soccer  │ baseball │      :
:  └─────────┴──────────┘      :
:                             :
└·······························┘

┌·······························┐
:        Science              :
:  ┌─────────┬──────────┐      :
:  │  math   │ biology  │      :
:  └─────────┴──────────┘      :
:                             :
└·······························┘

┌·······························┐
:        Music                :
:  ┌─────────┬──────────┐      :
:  │  jazz   │  opera   │      :
:  └─────────┴──────────┘      :
:                             :
└·······························┘
```

⟹

23

┌──────────────┐
│ CLASSIFICATION │
│     UNIT      │
└──────────────┘

⟹

PREDICTION
PROBABILITY

| 0.3 | 0.2 | 0.1 |
|---|---|---|
| Science | math | biology |

| 0.9 | 0.2 | 0.8 |
|---|---|---|
| Sports | soccer | baseball |

| 0.2 | 0.1 | 0.3 |
|---|---|---|
| Music | jazz | opera |

CLASSIFICATION RESULT→Sports

FIG. 15

| USER ID | TWEET ID | TWEET TEXT | KEYWORD | CATEGORY | DATE & TIME POSTED |
|---|---|---|---|---|---|
| user 001 | tweet 001 | "I went to the XX Hospital today. The examination went smoothly, and the staff were very kind. #XX Hospital #Examination #Staff #Kindness" | Hospital, Examination, Staff, Kind | General medical facility | 2023-04-08 10:30:00 |
| user 001 | tweet 002 | "Yesterday, I went for a health check at the XX Medical Center with my friends. The results were fine, so I'm relieved. #XXMedicalCenter #HealthCheckup #Relieved" | Medical center, Health check, Peace of mind | General medical facility | 2023-04-07 20:15:00 |
| user 002 | tweet 003 | "The other day, I visited the XX Clinic. The waiting time was short, and the staff were courteous. I would like to use their services again. #XXClinic #WaitingTime #Courteous" | Clinic, Waiting time, Staff, Courteous | Small-scale medical facility | 2023-04-06 15:45:00 |
| user 003 | tweet 004 | "Today, I went to the outpatient department of XX General hospital. It was crowded, so the waiting time was long, but the doctor's examination was very courteous. #XXGeneralHospital #Outpatient #WaitingTime #Courteous" | General hospital, Outpatient Department, Waiting time, Examination, Courteous | Comprehensive medical facility | 2023-04-05 12:00:00 |

FIG. 16

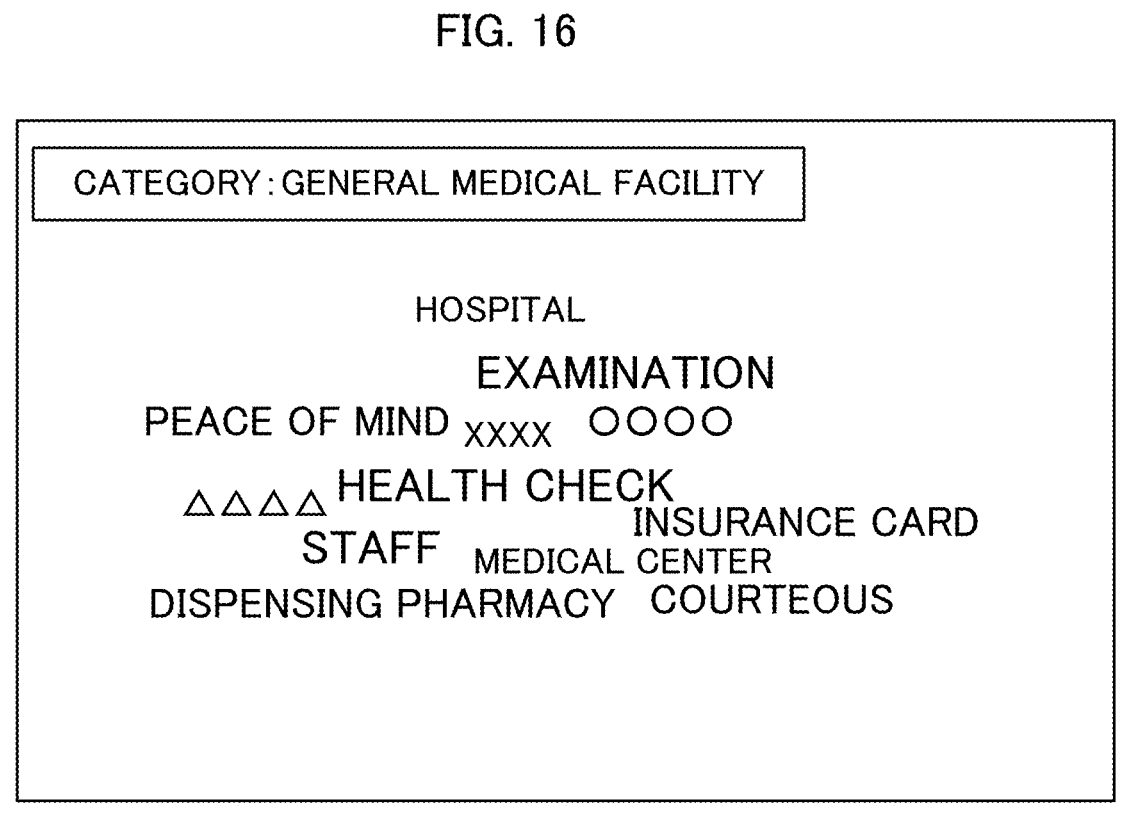

CATEGORY : GENERAL MEDICAL FACILITY

HOSPITAL

EXAMINATION

PEACE OF MIND xxxx   OOOO

△△△△ HEALTH CHECK

INSURANCE CARD

STAFF   MEDICAL CENTER

DISPENSING PHARMACY   COURTEOUS

INFORMATION PROCESSING DEVICE, INFORMATION PROCESSING METHOD, AND RECORDING MEDIUM

This application is a National Stage Entry of PCT/JP2023/016881 filed on Apr. 28, 2023, the contents of all of which are incorporated herein by reference, in their entirety.

TECHNICAL FIELD

The present disclosure relates to classification of document data.

BACKGROUND ART

There has been proposed a text classification technique to classify the inputted text data into one of several classes. For example, Patent Documents 1 and 2 disclose a technique for classifying document data into predetermined classes using keywords.

PRECEDING TECHNICAL REFERENCES

Patent Document

Patent Document 1: Japanese Patent Application Laid-Open under No. 05-324726

Patent Document 2: International Publication No. 2009/087757

SUMMARY

Problem to be Solved

In the above-mentioned text classification method using keywords, the accuracy of the classification varies greatly depending on whether or not the keywords used are appropriate. Therefore, it is important to properly determine the keywords used for classification.

One object of the present disclosure is to provide an information processing device capable of determining appropriate keywords for text classification.

Means for Solving the Problem

According to an example aspect of the present disclosure, there is provided an information processing device comprising:

a class acquisition means configured to acquire multiple classes to which target data is classified;

a candidate set generation means configured to generate a keyword candidate set which is a set of keyword candidates corresponding to each class; and a keyword set generation means configured to generate a keyword set corresponding to each class, from the keyword candidate set corresponding to each class, based on a relationship between the keywords included in the keyword candidate sets.

According to another example aspect of the present disclosure, there is provided an information processing method executed by a computer, comprising:

acquiring multiple classes to which target data is classified;

generating a keyword candidate set which is a set of keyword candidates corresponding to each class; and generating a keyword set corresponding to each class, from the keyword candidate set corresponding to each class, based on a relationship between the keywords included in the keyword candidate set.

According to another example aspect of the present disclosure, there is provided a recording medium recording a program, the program causing a computer to execute processing comprising:

acquiring multiple classes to which target data is classified;

generating a keyword candidate set which is a set of keyword candidates corresponding to each class; and generating a keyword set corresponding to each class, from the keyword candidate set corresponding to each class, based on a relationship between the keywords included in the keyword candidate set.

BRIEF DESCRIPTION OF THE DRAWINGS

FIG. 3 is a block diagram showing a functional configuration of the text classification device.

FIG. 4 shows an example of input and output of a keyword candidate acquisition unit.

FIG. 5 shows an example of inputs and outputs of an optimization unit.

FIG. 9 shows an example of generating a keyword set by a first method.

FIG. 10 shows an example of generating a keyword set by a second method.

FIG. 11 shows an example of text classification by a classification unit.

FIG. 15 shows an example of analysis results of information related to hospitals by a server device.

FIG. 16 shows an example of displaying search results to a user.

EXAMPLE EMBODIMENTS

Preferred example embodiments of the present invention will be described with reference to the accompanying drawings.

First Example Embodiment

[Concept of Text Classification Device]

Figure 1:
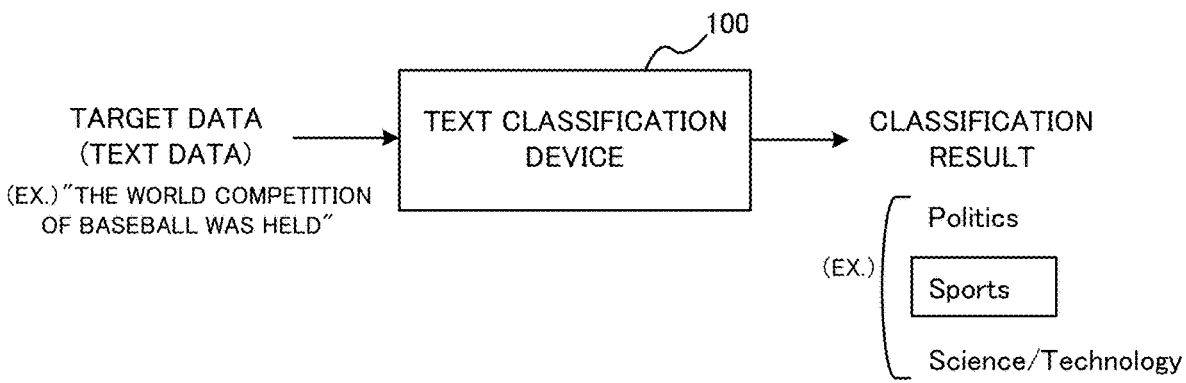
FIG. 1 shows a concept of a text classification device according to a first example embodiment.

FIG. 1 shows a concept of a text classification device according to a first example embodiment. The text classification device 100 classifies inputted text data (hereinafter referred to as "target data") into one of a plurality of predetermined classes. In the example of FIG. 1, the target data "The world competition of baseball was held" is inputted to the text classification device 100. The text classification device 100 classifies the target data into one of three predetermined classes: "Politics", "Sports", and "Science/Technology". In this example, the text classification device 100 classifies the target data into the class "Sports" and outputs the classification result "Sports". In the following example embodiment, the text classification device 100 classifies the target data using a set of keywords prepared corresponding to the plurality of classes, the details of which will be described later.

[Hardware Configuration]

Figure 2:
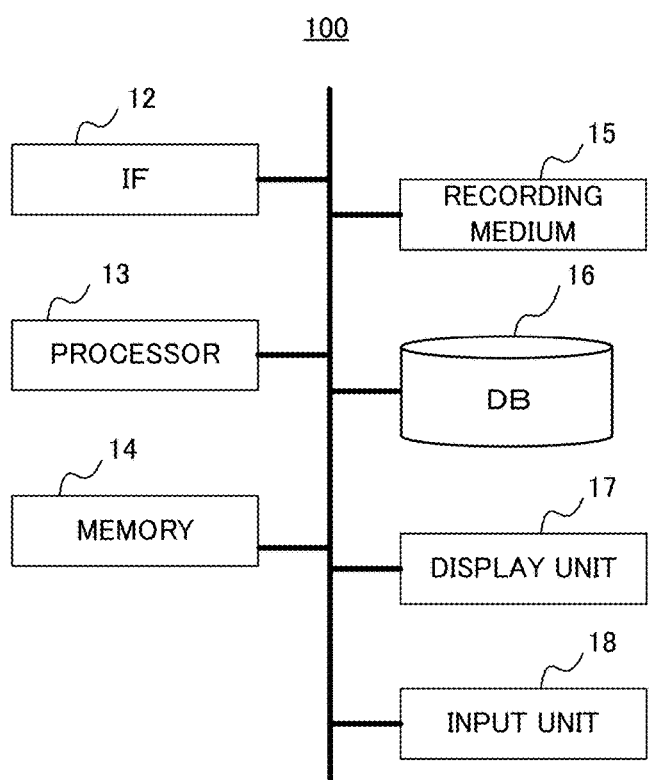
FIG. 2 is a block diagram illustrating a hardware configuration of the text classification device.

FIG. 2 is a block diagram illustrating a hardware configuration of the text classification device 100. As shown, the text classification device 100 includes an interface (IF) 12, a processor 13, a memory 14, a recording medium 15, a database (DB) 16, a display unit 17, and an input unit 18.

The IF 12 acquires the target data from outside and outputs the classification result of the target data to outside. The IF 12 also acquires the keyword candidates for generating the keyword sets, which will be described later, from outside.

The processor 13 is a computer, such as a CPU (Central Processing Unit), that controls the entire text classification device 100 by executing a program prepared in advance. As the processor 13, a CPU, a GPU (Graphics Processing Unit), a DSP (Digital Signal Processor), a MPU (Micro Processing Unit), a FPU (Floating Point number Processing Unit), a PPU (Physics Processing Unit), a TPU (Tensor Processing Unit), a quantum processor, a microcontroller, or a combination thereof may be used. The processor 13 performs keyword optimization processing and text classification processing, which will be described later.

The memory 14 includes a ROM (Read Only Memory) and a RAM (Random Access Memory). The memory 14 stores various programs executed by the processor 13. The memory 14 is also used as a working memory during various processes performed by the processor 13.

The recording medium 15 is a non-volatile and non-transitory recording medium such as a disk-like recording medium, a semiconductor memory, or the like, and is configured to be detachable to the text classification device 100. The recording medium 15 records various programs executed by the processor 13. When the text classification device 100 performs various processing, the program recorded on the recording medium 15 is loaded into the memory 14 and executed by the processor 13.

The DB 16 stores keyword candidate sets, including keyword candidates that the IF 12 acquires from outside. The DB 16 also stores keyword sets generated by selecting the appropriate keyword candidates from the keyword candidate sets. In addition, the DB 16 stores the classification model used for text classification, the names of the classes to which the target data are classified, and the classification result obtained by the text classification processing.

The display unit 17 may be a liquid crystal display, for example. The input unit 18 includes, for example, a keyboard and a mouse. The display unit 17 and the input unit 18 are used, for example, when the user or the operator of the text classification device 100 makes necessary operation and input.

[Functional Configuration]

FIG. 3 is a block diagram showing a functional configuration of the text classification device 100. As shown, the text classification device 100 functionally includes a target data acquisition unit 21, a classification model acquisition unit 22, a classification unit 23, a class name acquisition unit 24, a keyword candidate acquisition unit 25, an optimization unit 26, a classification model storage unit 31, a class name storage unit 32, a keyword candidate storage unit 33, a keyword storage unit 34, and a classification result storage unit 35. The classification model storage unit 31, the class name storage unit 32, the keyword candidate storage unit 33, the keyword storage unit 34, and the classification result storage unit 35 are realized by the above-described DB 16.

The text classification according to the present example embodiment is mainly performed in two steps: the optimization of keywords used for text classification (hereinafter referred to as "keyword optimization") and the classification of target data using the optimized keywords (hereinafter referred to as "text classification").

(Configuration for Keyword Optimization)

First, components for performing the keyword optimization will be described. The keyword optimization is mainly executed by the class name acquisition unit 24, the keyword candidate acquisition unit 25, and the optimization unit 26.

The class name storage unit 32 stores class names of a plurality of classes to which the target data are classified when the text classification of the target data is performed. The class name acquisition unit 24 acquires the class names of the plurality of classes from the class name storage unit 32. The class name acquisition unit 24 may acquire a plurality of predetermined class names from among the plurality of class names stored in the class name storage unit 32, or may acquire a plurality of class names selected by a user. The class name acquisition unit 24 outputs the acquired plurality of class names to the keyword candidate acquisition unit 25. The class name acquisition unit 24 is an example of a class acquisition means.

The keyword candidate acquisition unit 25 collects the class name and the related keyword candidates for each class name inputted from the class name acquisition unit 24, and generates keyword candidate sets. FIG. 4 shows an example of the input and output of the keyword candidate acquisition unit 25. For each of the plurality of class names, the keyword candidate acquisition unit 25 acquires the keyword candidates related to the class name. In FIG. 4, the keyword candidate acquisition unit 25 acquires a plurality of keyword candidates such as "soccer" and "baseball" for the class name "Sports" inputted from the class name acquisition unit 24, and generates a keyword candidate set including the acquired keyword candidates. The keyword candidate acquisition unit 25 is an example of the candidate set generation means.

As a specific method, the keyword candidate acquisition unit 25 may refer to the dictionary data and extract the synonym, subordinate word, or the like of the class name as the keyword candidates. In addition, the keyword candidate acquisition unit 25 may obtain a sentence including the class name from a large-scale corpus such as Wikipedia, for example, and use the phrases extracted from the sentence using a known key phrase extraction technique as the keyword candidates. In this way, the keyword candidate acquisition unit 25 generates a keyword candidate set for each class as illustrated in FIG. 4, stores the keyword candidate set in the keyword candidate storage unit 33, and outputs the keyword candidate set to the optimization unit 26.

Figure 5:
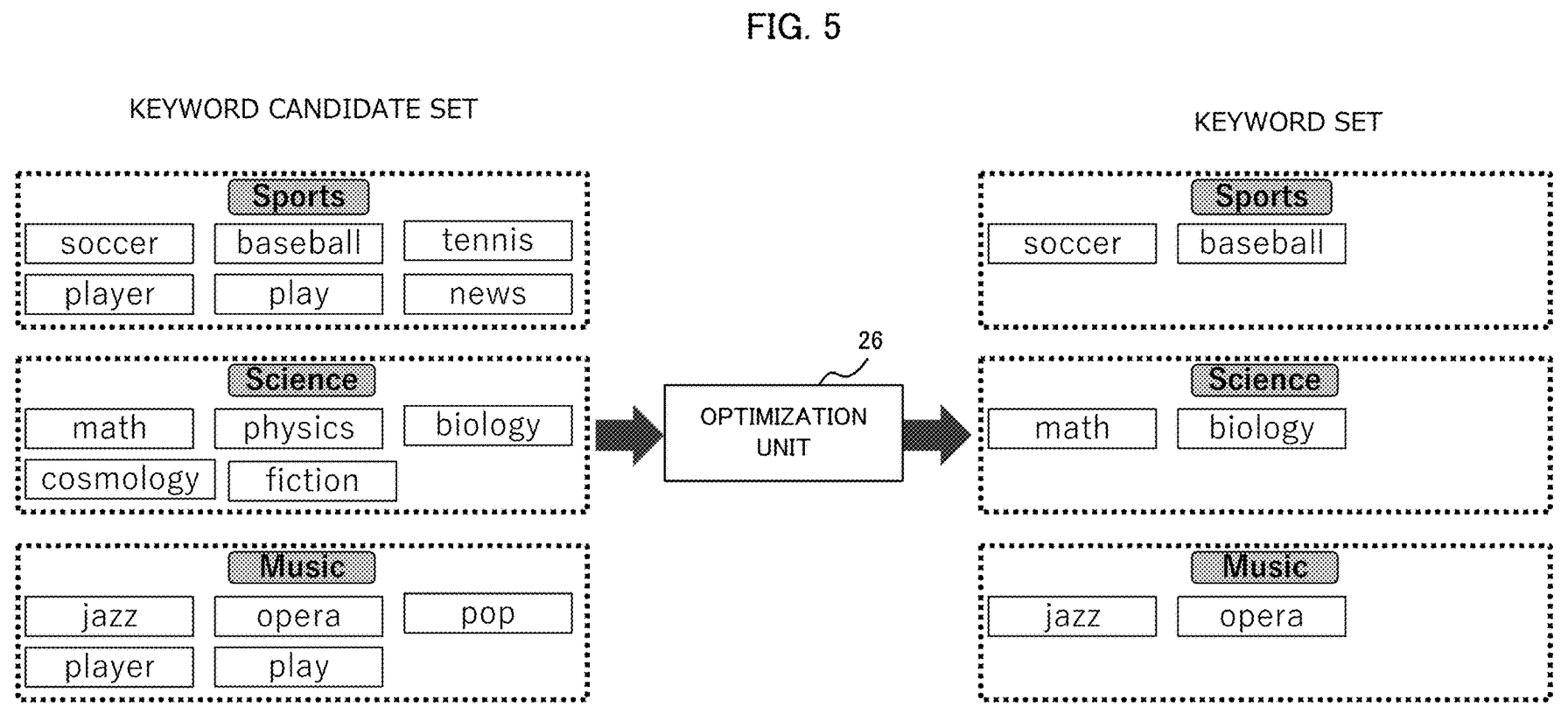

The optimization unit 26 performs optimization of the keywords used for the text classification. Specifically, the optimization unit 26 selects appropriate keywords from the keyword candidate set for each class generated by the keyword candidate acquisition unit 25 and generates a keyword set for each class. In other words, the optimization unit 26 generates, from the keyword candidate set, a subset of keyword candidates having a favorable property as a keyword set. FIG. 5 shows an example of the inputs and outputs of the optimization unit 26. The keyword candidate set for each class is inputted from the keyword candidate acquisition unit 25 to the optimization unit 26. For each class, the optimization unit 26 selects appropriate keywords from the keyword candidate set and generates the keyword set. Then, the optimization unit 26 stores the generated keyword sets in the keyword storage unit 34, and outputs the keyword sets to the classification unit 23.

Next, the processing of the optimization unit 26 will be described in detail. The optimization unit 26 generates the keyword set $P^*_k$ by solving the combinatorial optimization problem of Formula (1) using the keyword candidate set for each class generated by the keyword candidate acquisition unit 25. Here, "$p^j_k$" denotes the "j-th" keyword of the "k-th" class, "$c_k$" denotes the "k-th" class name, and "K" denotes the set of all classes. If this optimization problem can be solved directly, it may be solved directly. If the optimization problem cannot be solved directly, an approximate solution obtained using a greedy method or the like may be used as the keyword set.

[Formula 1]

$$\{P^*_k\}^K_{k=1} = \underset{\{P_k \subset V_k\}^K_{k=1}}{\arg \max} \underbrace{\sum_{k=1}^{K}\sum_{j=1}^{}s(p^j_k, c_k, \{P_k\}^K_{k=1})}_{SCORE\ S} \quad (1)$$

$V_k$ KEYWORD CANDIDATE SET OF CLASS $k$ $c_k$: CLASS NAME OF CLASS $k$ $P_k = \{p^1_k, p^2_k, \dots p^{n_k}_k\}$: KEYWORD SET OF CLASS $k$ $p^j_k$: CANDIDATE KEYWORD OF CLASS $k$ ($j$ IS SUFFIX FOR EACH KEYWORD)

Here, the score $S=s(p^j_k,c_k,\{P_k\}^K_{k=1})$ in Formula (1) is given by the following formula.

[Formula 2]

$$\underbrace{s(p^j_k, c_k, \{P_k\}^K_{k=1})}_{SCORE\ S} = a \cdot \underbrace{s_o(p^j_k, c_k)}_{S0} + \beta \cdot \underbrace{s_1(p^j_k, \{P_{k'}\}_{k' \in K \setminus k})}_{S1} + \gamma \cdot \underbrace{s_2(p^j_k, P_k)}_{S2} \quad (2)$$

$$0 \leq \alpha, \beta, \gamma \leq 1, \alpha + \beta + \gamma = 1$$

$\alpha, \beta, \gamma$: HYPERPARAMETER

That is, the score S is expressed by:

$$S = \alpha \cdot S0 + \beta \cdot S1 + \gamma \cdot S2$$

Note that $\alpha$, $\beta$, and $\gamma$ in Formula (2) are hyperparameters, indicating the weights of the respective scores S0, S1, S2 in the score S.

Figure 6:
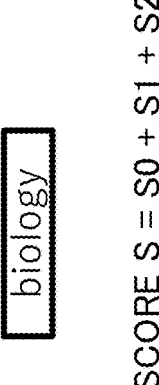
FIG. 6 is a diagram for explaining meaning of each score.

FIG. 6 is a diagram for explaining the meaning of the scores S0 to S2. The score S0 indicates the degree of similarity between a class name of a class and the keyword belonging to that class. In other words, the score S0 indicates how preferable a keyword is for a class to which the keyword belongs. The higher the preference is, the larger the value is.

The score S1 indicates the exclusivity between a keyword belonging to a class and another keyword belonging to a different class (also referred to as "inter-class exclusivity"). In other words, the score S1 indicates the degree (degree of dissimilarity) that the keyword belonging to one class is not similar to the keyword belonging to another class. The higher the degree of dissimilarity is, the larger the score is.

The score S2 shows the diversity between a keyword belonging to a class and another keyword belonging to the same class (also referred to as "intra-class diversity"). In other words, the score S2 indicates the degree (degree of dissimilarity) that a keyword belonging to a certain class is not similar to another keyword belonging to the same class. The higher the degree of dissimilarity, the larger the value is.

Thus, for a certain keyword belonging to a certain class, the more similar the keyword is to the class name of the class, the higher the score S is. Also, the more dissimilar the keyword is to the keyword in another class, the higher the score S is. Further, the more dissimilar the keyword is to another keyword in the same class, the higher the score S is.

As the indices of the degree of similarity indicated by the score S0 and the degree of dissimilarity indicated by the scores S1 and S2, the optimization unit 26 calculates embedded vectors from a class name and a keyword, for example, and may use the cosine similarity between them. Thus, the optimization unit 26 selects the keyword candidates for each class from the keyword candidate set for each class such that the sum of the above-described score S is maximized, and generates the keyword set for each class. Incidentally, the optimization unit 26 is an example of a keyword set generation means.

Figure 7:
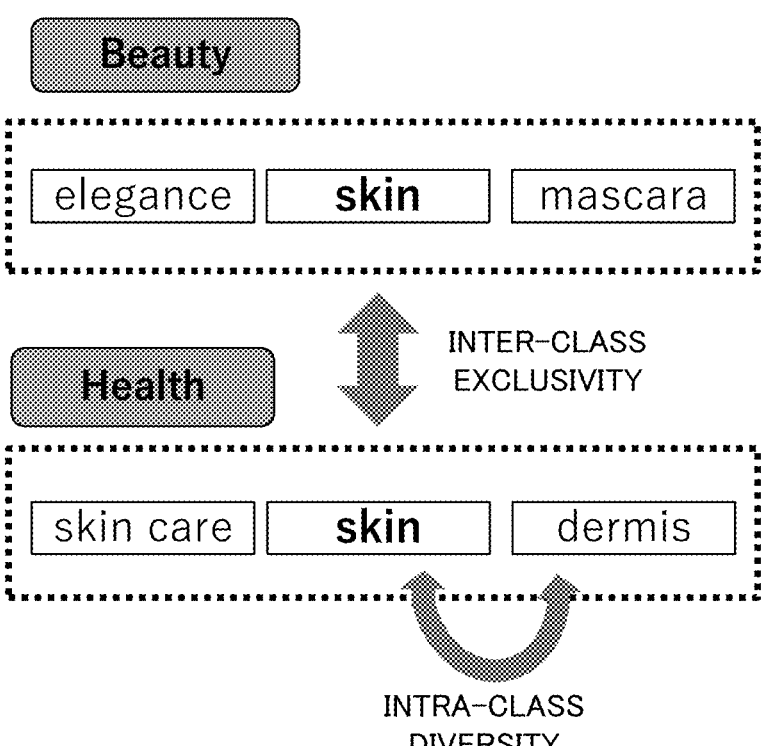
FIG. 7 is a diagram for explaining inter-class exclusivity and intra-class diversity.

FIG. 7 is a diagram illustrating the above-described inter-class exclusivity and intra-class diversity. It is supposed that there are two classes, "Beauty" and "Health" as shown in FIG. 7. In this example, both the two classes "Beauty" and "Health" include the keyword "skin". When different classes include the same or similar keyword, if the target data includes the word "skin", there is a possibility that the accuracy of determining one of the two classes "Beauty" and "Health" to which the target data should be classified may be reduced. Therefore, in the present example embodiment, by using the score S1, the optimization unit 26 becomes likely to select the keywords having high inter-class exclusivity. By considering the inter-class exclusivity in this way, it is possible to reduce the overlap of keywords between different classes.

Further, in the example of FIG. 7, two keywords "skin" and "dermis" having similar meanings are included in the same class "Health". If similar keywords are included in the same class, the target data classified to the class "Health" may be biased toward those including words having a meaning close to "skin" or "dermis." In other words, it is preferable to classify the target data from various viewpoints by including as many keywords as possible in the same class. Therefore, in the present example embodiment, by using the score S2, the optimization unit 26 becomes likely to select keywords having high intra-class diversity. By considering the intra-class diversity in this way, it is possible to reduce the duplication of keywords in the same class.

Next, a specific example of the optimization unit 26 will be described. In this example, the optimization unit 26 obtains the solution by solving the optimization problem of selecting one keyword of one class multiple times using a greedy method. In other words, the optimization unit 26 generates the keyword set by sequentially determining the preferable keywords one by one from the keyword candidate sets. Specifically, the optimization unit 26 obtains one solution to the optimization problem of Formula (1) by solving the partial optimization problem given by the following Formula (3) the required number of times (i.e., the number of classes×a predetermined number of keywords).

[Formula 3]

$$\hat{p}_k^j = \underset{p_k^j \subset V_k \backslash P_k}{\mathrm{argmax}} \underbrace{s\left(p_k^j, c_k, \{P_k\}_{k=1}^K\right)}_{\text{SCORE } S} \quad (3)$$

Incidentally, the score S in the right side of Formula (3) is the same as the above Formula (2).

Figure 8:
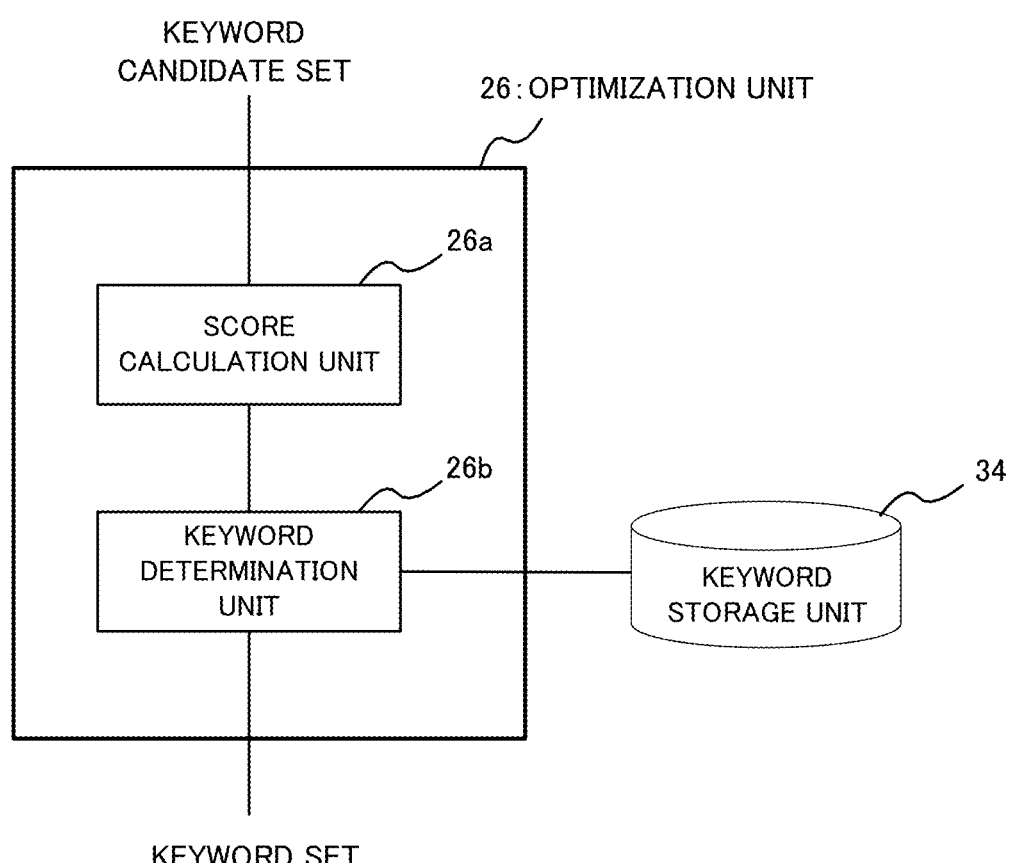
FIG. 8 shows a configuration of the optimization unit when an optimization problem is solved by a greedy method.

FIG. 8 is a block diagram showing a configuration of the optimization unit 26 in the case where the optimization problem given by Formula (1) is solved by a greedy method. As illustrated, the optimization unit 26 includes a score calculation unit 26*a* and a keyword determination unit 26*b*. The score calculation unit 26*a* calculates the score S for each keyword candidate included in each keyword candidate set inputted from the keyword candidate acquisition unit 25 and outputs the score S to the keyword determination unit 26*b*. Based on the score S of each keyword candidate of each class calculated by the score calculation unit 26*a*, the keyword determination unit 26*b* determines a preferred keyword candidate, i.e., a keyword candidate having a high score S among a plurality of keyword candidates of each class as a keyword. The keyword determination unit 26*b* performs this process several times to generate the keyword set, which is a set of preferred keywords, for each class.

Next, description will be given of a method in which the optimization unit 26 generates the keyword set. In the first method, the optimization unit 26 selects keywords equally for each class to generate the keyword sets. FIG. 9 shows an example of generating the keyword sets by the first method. In the first method, the optimization unit 26 determines the keywords so that the number of keywords selected for each class becomes even, by first determining the first keyword for each class, then determining the second keyword for each class, and then determining the third keyword for each class.

In the example of FIG. 9, in a state where no keyword is determined for any class, the score calculation unit 26*a* first calculates the score S for all the key word candidates belonging to the three classes. In this case, in the score S, the scores S1 and S2 are both 0. The keyword determination unit 26*b* determines a keyword candidate for which the score S is the highest among all the keyword candidates belonging to the three classes, as a keyword. In the example of FIG. 9, the keyword "math" for the class "Science" is determined first.

Next, the score calculation unit 26*a* calculates the score S for all the keyword candidates belonging to the remaining classes "Sports" and "Music" in a state where the keyword "math" is included in the keyword set of the class "Science". At this time, the scores S1 and S2 are calculated based on the keyword "math" already determined for the class "Science". Then, the keyword determination unit 26*b* determines the keyword candidate having the highest score S among the keyword candidates belonging to the remaining classes "Sports" and "Music", as the keyword. Thus, the keyword "soccer" of the class "Sports" is determined.

Next, the score calculation unit 26*a* calculates the score S for all the keyword candidates belonging to the remaining class "Music" in a state where the keyword "math" is included in the keyword set of the class "Science" and the keyword "soccer" is included in the keyword set of the class "Sports". Then, the keyword determination unit 26*b* determines the keyword candidates having the highest score S among the keyword candidates belonging to the class "Music", as the keyword. Thus, the keyword "jazz" of the class "Music" is determined.

In this way, when the first keyword is determined for each class, the optimization unit 26 sequentially determines the second keyword and the third keyword for each class by the same procedure. Then, when the number of keywords determined for each class reaches a predetermined number m, the optimization unit 26 ends the generation of the keyword sets.

On the other hand, in the second method, the optimization unit 26 determines the keywords in the order from the keyword candidates having the high score S at the individual time points. Therefore, in the second method, the keywords are determined first for the class including many keyword candidates with high scores. FIG. 10 shows an example of generating a keyword set by the second method.

In the example embodiment of FIG. 10, in a state where no keyword is determined for any class, the score calculation unit 26*a* first calculates the score S for all the keyword candidates belonging to the three classes. The keyword determination unit 26*b* determines a keyword candidate for which the score S is the highest among all the keyword candidates belonging to the three classes, as a keyword. In the example of FIG. 10, the keyword "math" for the class "Science" is determined first.

Next, the score calculation unit 26*a* calculates the score S for all the key word candidates belonging to the three classes in a state where the key word "math" is included in the keyword set of the class "Science". Then, the keyword determination unit 26*b* determines a keyword candidate for which the score S is the highest among the keyword candidates belonging to all classes, as a keyword. Thus, the keyword "soccer" of the class "Sports" is determined.

Next, the score calculation unit 26*a* calculates the score S for all the keyword candidates belonging to all classes in a state where the keyword "math" is included in the keyword set of the class "Science" and the keyword "soccer" is included in the keyword set of the class "Sports". Then, the keyword determination unit 26*b* determines the keyword candidate having the highest score S among the keyword candidates belonging to all the classes, as the keyword. Thus, the key word "baseball" of the class "Sports" is determined.

In this way, in the second method, when the keyword of any class is determined, the scores S are calculated for all the keyword candidates of all the classes in that state, and the keyword candidate having the highest score S is determined as the keyword. Therefore, as shown in the example of FIG. 10, it is possible that plural keywords are successively determined for a single class. However, even in the second method, it is possible to finally determine the keywords of a predetermined number m for each class, by determining the the keywords only for the remaining classes after the number of keywords of a certain class reaches the predetermined number m.

The keyword set for each class determined as described above may be displayed on the display unit 17 so that the user can view the keywords. Also, the user may be able to correct the keyword set as needed. For example, the user may be able to delete an inappropriate keyword or change a keyword to a more appropriate keyword.

(Configuration for Text Classification)

Next, the components for the text classification will be described. In FIG. 3, the text classification is mainly executed by the target data acquisition unit 21, the classification model acquisition unit 22, and the classification unit 23. In the text classification, the keyword set for each class generated by the optimization unit 26 is used.

The target data acquisition unit 21 acquires the target data subjected to the text classification and outputs it to the classification unit 23. The classification model storage unit 31 stores plural types of models for performing the text classification. The classification model acquisition unit 22 acquires the classification model from the classification model storage unit 31 and outputs the classification model to the classification unit 23. Incidentally, the classification model acquisition unit 22 acquires a classification model of the type that performs classification using the keyword, among the plurality of classification models stored in the classification model storage unit 31.

The classification unit 23 acquires the target data from the target data acquisition unit 21, acquires the classification model from the classification model acquisition unit 22, and acquires the keyword set for each class of the classification destination from the optimization unit 26. Then, the classification unit 23 classifies the target data using the acquired classification model. That is, the classification unit 23 determines which of the plurality of classes the target data belongs to.

FIG. 11 shows an example of the text classification by the classification unit 23. As shown in FIG. 11, the target data is "The world competition of baseball was held." The keyword sets for three classes "Sports," "Science," and "Music" are inputted from the optimization unit 26. In addition, the classification model is a model that classifies the target data using the prediction probability of the class name for the target data and the statistical value (average value, maximum value, etc.) of the prediction probability of each keyword for the target data, for each class of the classification destination. As the prediction probability, relevance or degree of semantic similarity of the target data with the class name or the keyword may be used, for example.

In the example of FIG. 11, the classification unit 23 calculates the prediction probability of the class name "Sports" for the target data as "0.9" and calculates the prediction probabilities of the keywords "soccer" and "baseball" for the target data as "0.2" and "0.8", respectively. The classification unit 23 similarly calculates the prediction probabilities for the class names "Science" and "Music", and the keywords belonging to the respective classes. Then, the classification unit 23 outputs the class "Sports" having the highest statistical value of the prediction probability among the three classes, as the classification result.

Thus, in the present example embodiment, the text classification can be performed using the appropriate keyword sets generated by the optimization unit 26. In particular, by optimizing the keywords in consideration of the inter-class exclusivity and the intra-class diversity as described above, it is possible to accurately classify the texts using the keywords that show unique characteristics of each class and the keywords that show multifaceted characteristics of each class.

The classification method by the classification unit 23 may be a method for performing classification using keywords for each class, and is not limited to a specific classification method. For example, as a classification method by the classification unit 23, a method described in the following Document 1 may be used.

Document 1: Hu et al., Knowledgeable Prompt-tuning: Incorporating Knowledge into Prompt Verbalizer for Text Classification, ACL2022

Instead, the classification unit 23 may perform the classification by applying keywords to the method described in Document 2 below.

Document 2: Yin et al., Benchmarking Zero-shot Text Classification: Datasets, Evaluation and Entailment Approach, EMNLP2019

Specifically, Document 2 converts the text classification task to the textual entailment recognition task, and classifies the classification target data based on the entailment relationship between the classification target data and the sentence "This sentence is related to (class name)." Therefore, the prediction probability for each class may be calculated using the statistical value (average value, maximum value, etc.) of the prediction probability obtained by inserting the keyword of each class into the portion of the "class name" of the above sentence, and the class for the classification target data may be determined.

[Keyword Optimization]

Figure 12:
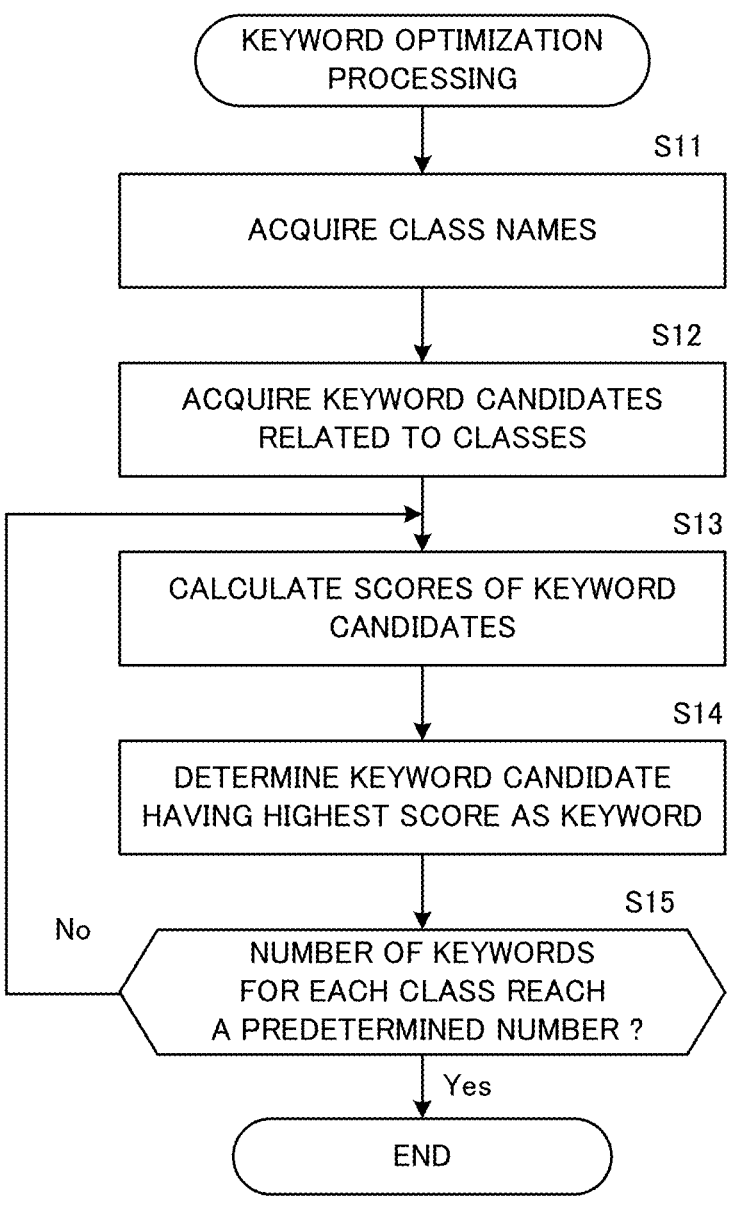
FIG. 12 is a flowchart of keyword optimization processing.

Next, keyword optimization processing performed by the text classification device 100 will be described. FIG. 12 is a flowchart of the keyword optimization processing. This processing is realized by the processor 13 shown in FIG. 2, which executes a pre-prepared program and operates as the elements shown in FIG. 3.

First, the class name acquisition unit 24 acquires a plurality of class names of classification destination of the target data from the class name storage unit 32 (step S11). Next, the keyword candidate acquisition unit 25 obtains the keyword candidates related to the respective classes using a dictionary or a corpus, and generates the keyword candidate sets (step S12). Next, the optimization unit 26 calculates the scores S for the keyword candidates belonging to the respective classes (step S13). Next, the optimization unit 26 determines the keyword candidate having a highest score as a keyword and put it in a keyword set of the corresponding class (step S14). Next, the optimization unit 26 determines whether or not the number of keywords reaches the predetermined number (step S15). If the number of keywords of each class does not reach the predetermined number (step S15: No), the process returns to step S13 and steps S13 to S15 are repeated. Then, when the number of keywords of each class reaches the predetermined number (step S15: Yes), the keyword optimization processing ends.

[Text Classification Processing]

Figure 13:
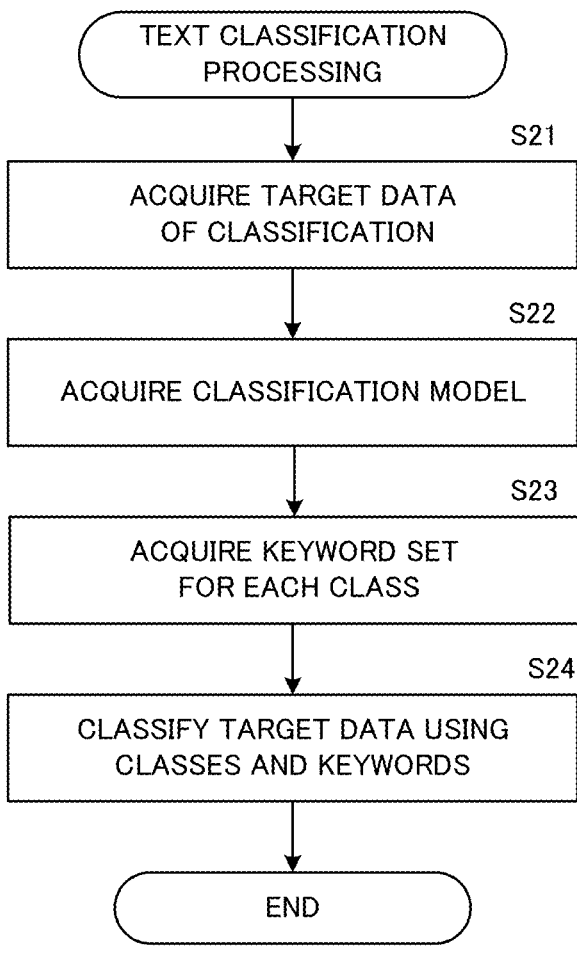
FIG. 13 is a flowchart of text classification processing.

Next, text classification processing performed by the text classification device 100 will be described. FIG. 13 is a flowchart of the text classification processing. This processing is realized by the processor 13 shown in FIG. 2, which executes a pre-prepared program and operates as the elements shown in FIG. 3.

First, the target data acquisition unit 21 acquires the target data and outputs it to the classification unit 23 (step S21). Next, the classification model acquisition unit 22 acquires, from the classification model storage unit 31, the classification model to be used, and outputs it to the classification unit 23 (step S22). Next, the classification unit 23 acquires the keyword set for each class of the classification destination from the optimization unit 26 (step S23). These keyword sets are generated by the keyword optimization processing described above. Next, the classification unit 23 classifies the target data using the class name and the keyword of the classification destination according to the classification model, and outputs the class name to which the target data belongs, as the classification result (step S24). Then, the text classification processing ends.

Application Example

An application example in which the above-described example embodiment is applied to the medical and healthcare areas will be described. The above example embodiment can be used to classify sentences or the like sent by SNS (Social Network Service) into appropriate categories. Hereinafter, an example of using the present example embodiment for searching information related to a hospital will be described.

Figure 14:
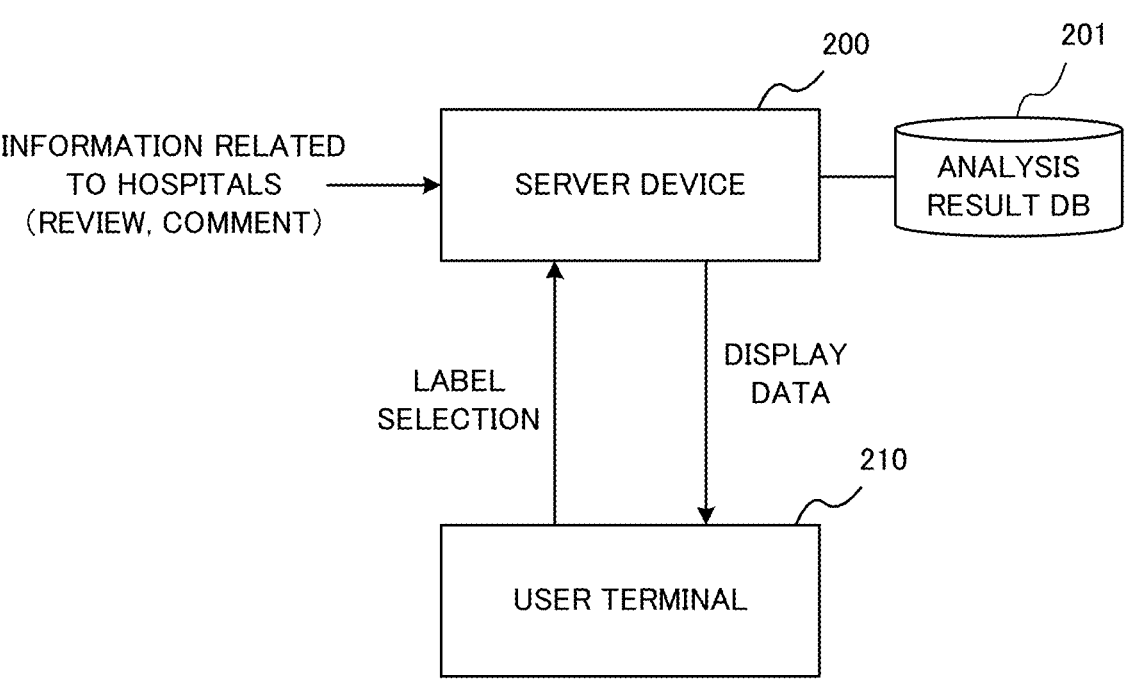
FIG. 14 shows a configuration of an information search system according to an application example of the example embodiment.

FIG. 14 shows a configuration of an information search system according to an application example of the example embodiment. The information search system includes a server device 200 and a user terminal 210. The server device 200 is connected to an analysis result DB 201. The server device 200 uses the SNS or the like to collect information about the hospitals such as reviews/comments transmitted and received on the Web, and analyzes the information using the method of the example embodiment.

FIG. 15 shows an example of the analysis result of the information on the hospitals by the server device 200. In the example of FIG. 15, the server device 200 collects the tweets utilizing the SNS and applies the text classification technique of the example embodiment described above. Specifically, the server device 200 receives the tweet text as the input, performs classification using the keyword set prepared beforehand for each class, and outputs the classification result as a category. At this time, the server device 200 extracts the keywords included in the tweet text, from the plurality of keywords included in the keyword set corresponding to the category obtained as the classification result. FIG. 15 shows the keywords thus extracted. Thus, the extracted keywords corresponding to each tweet will appropriately show the content of the tweet text. The server device 200 stores the analysis result thus obtained in the analysis result DB 201.

A user who wants to search information about hospitals accesses a hospital search site or the like operated by the server device 200 by operating the user terminal 210. The user terminal 210 is a PC, a smartphone, or the like. The server device 200 presents a plurality of categories included in the analysis results illustrated in FIG. 15 to the user in the hospital search site as the options. As the category to be presented to the user, for example, a type of the hospital, a medical subject, or the like can be used. The user selects categories that he or she is interested, from the multiple categories.

The server device 200 refers to the analysis result DB 201 storing the analysis results illustrated in FIG. 15 and extracts the keywords corresponding to the categories selected by the user. For example, it is supposed that the analysis results including the analysis result shown in FIG. 15 is stored in the analysis result DB 201 and the user selected "General medical facility" as the category. In this case, the server device 200 acquires the keywords such as "Hospital", "Examination", "Staff", "Kind", "Medical center", "Health check", and "Peace of mind" that correspond to tweet_001 and tweet_002. The server device 200 also acquires the keywords corresponding to other tweets classified into the category "General medical facility" in addition to the tweets shown in FIG. 15, if any. The server device 200 transmits the acquired keywords as a search result to the user terminal 210 to be displayed. Since the keywords that are stored in association with the categories in the analytical results DB 201 show the content of the original tweets well, the user can easily see the evaluation on the SNS of the categories he or she has selected by looking at the presented keywords.

FIG. 16 shows an example of displaying the search results to a user. In the example of FIG. 16, the server device 200 displays the acquired keywords in the form of a wordcloud. The wordcloud enables users to visually and easily understand keywords and phrases included in reviews and comments. In the text classification method of the example embodiment, the same or similar keywords are eliminated by the keyword optimization in the keyword set of each class, so that the same or similar keywords are not duplicated in the displayed wordcloud.

In the example of FIG. 16, the keyword for the category "General medical facility" is displayed. However, the user can further specify a medical institution or the like to search for information. In that case, the server device 200 extracts the medical institution names from the tweet text and stores them in the analysis result DB 201. When the user selects a category and a medical institution name, the server device 200 extracts and displays keywords corresponding to the selected category and the medical institution name. This allows the user to know the evaluation of each medical institution on the SNS.

Second Example Embodiment

Figure 17:
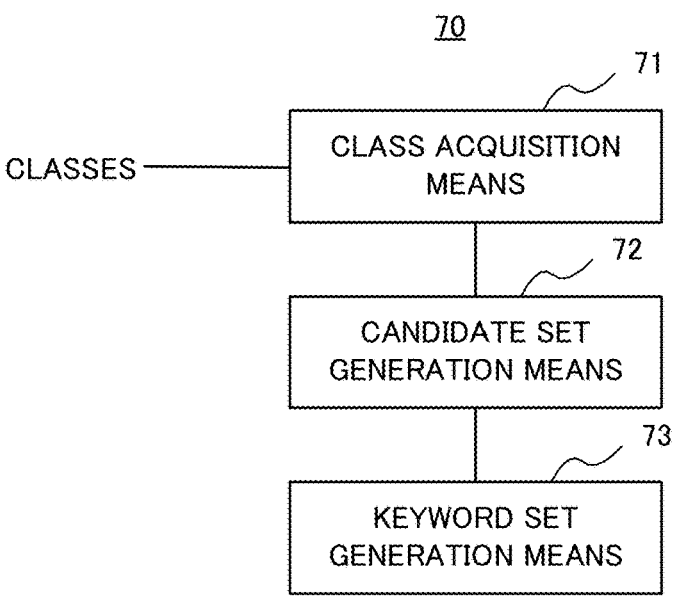
FIG. 17 is a block diagram showing a configuration of an information processing device according to a second example embodiment.

FIG. 17 is a block diagram illustrating a configuration of an information processing device according to a second example embodiment. The information processing device 70 according to the second example embodiment includes a class acquisition means 71, a candidate set generation means 72, and a keyword set generation means 73.

Figure 18:
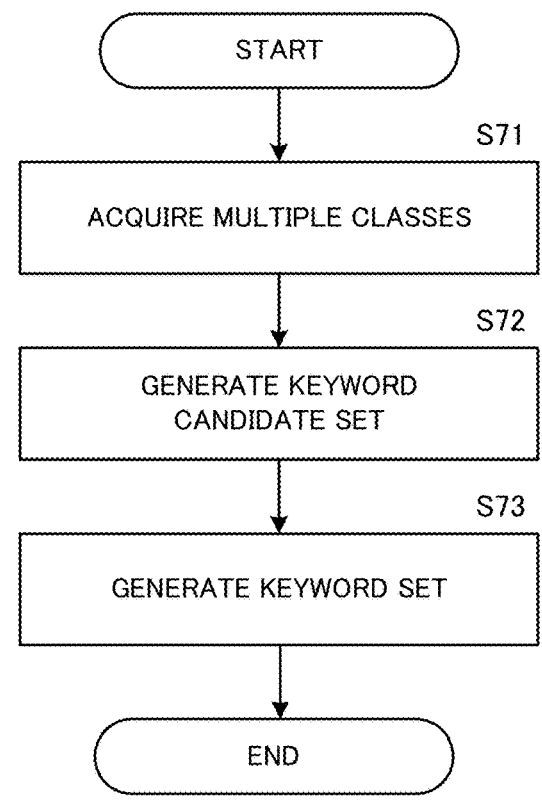
FIG. 18 is a flowchart of processing by the information processing device according to the second example embodiment.

FIG. 18 is a flowchart of processing executed by the information processing device 70 according to the second example embodiment. The class acquisition means 71 acquires multiple classes to which target data is classified (step S71). The candidate set generation means 72 generates a keyword candidate set which is a set of keyword candidates corresponding to each class (step S72). The keyword set generation means 73 generates a keyword set corresponding to each class, from the keyword candidate set corresponding to each class, based on a relationship between the keywords included in the keyword candidate sets (step S73).

According to the information processing device 70 of the second example embodiment, it is possible to determine appropriate keywords for text classification.

A part or all of the example embodiments described above may also be described as the following supplementary notes, but not limited thereto.

(Supplementary Note 1)

An information processing device comprising:

a class acquisition means configured to acquire multiple classes to which target data is classified;

a candidate set generation means configured to generate a keyword candidate set which is a set of keyword candidates corresponding to each class; and a keyword set generation means configured to generate a keyword set corresponding to each class, from the keyword candidate set corresponding to each class, based on a relationship between the keywords included in the keyword candidate sets.

(Supplementary Note 2)

The information processing device according to Supplementary note 1, further comprising a classification means configured to classify the target data to one of the multiple classes using the keyword sets.

(Supplementary Note 3)

The information processing device according to Supplementary note 1, wherein the keyword set generation means selects an optimum keyword candidate from the keyword candidate set based on a relationship between the keywords belonging to different classes and a relationship between the keywords belonging to a same class, and includes the optimum keyword in the keyword set.

(Supplementary Note 4)

The information processing device according to Supplementary note 3, wherein the keyword set generation means selects, from the keyword candidates belonging to each class, the keyword candidate having a lowest degree of similarity to the keywords belonging to a different class and having a lowest degree of similarity to other keywords belonging to the same class.

(Supplementary Note 5)

The information processing device according to Supplementary note 3, wherein the keyword set generation means adds the keyword candidate to the keyword set in an order from the keyword candidate having a highest total score of a first to third scores, among the keyword candidates belonging to each class, wherein the first score becomes larger as the degree of similarity between the keyword candidate and the class to which the keyword candidate belongs is higher, wherein the second score becomes larger as the degree of similarity between the keyword candidate and the keyword belonging to a class different from the keyword candidate is lower, and wherein the third score becomes larger as the degree of similarity between the keyword candidate and another keyword belonging to the same class as the keyword candidate is lower.

(Supplementary Note 6)

The information processing device according to Supplementary note 5, wherein the keyword set generation means selects, for each class, a predetermined number of keyword candidates in an order from the keyword candidate having a highest total score, and adds the selected keyword candidates to the keyword set corresponding the class.

(Supplementary Note 7)

The information processing device according to Supplementary note 5, wherein the keyword set generation means selects the keyword candidates in an order from the keyword candidate having the highest total score in all the classes, and adds the keyword candidates to the keyword set corresponding to the class.

(Supplementary Note 8)

An information processing method executed by a computer, comprising:

acquiring multiple classes to which target data is classified;

generating a keyword candidate set which is a set of keyword candidates corresponding to each class; and generating a keyword set corresponding to each class, from the keyword candidate set corresponding to each class, based on a relationship between the keywords included in the keyword candidate set.

(Supplementary Note 9)

A recording medium recording a program, the program causing a computer to execute processing comprising:

acquiring multiple classes to which target data is classified;

generating a keyword candidate set which is a set of keyword candidates corresponding to each class; and generating a keyword set corresponding to each class, from the keyword candidate set corresponding to each class, based on a relationship between the keywords included in the keyword candidate set.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

13 Processor
    21 Target data acquisition unit
    22 Classification model acquisition unit
    23 Classification unit
    24 Class name acquisition unit
    25 Keyword candidate acquisition unit
    26 Optimization unit
    26a score calculation unit
    26b keyword determination unit
    100 Text classification device
    200 Server device
    201 Analysis result DB
    210 User terminal

What is claimed is:

1. An information processing device comprising:
    a memory configured to store instructions; and
    one or more processors configured to execute the instructions to:
    acquire multiple classes to which target data is classified;
    generate a keyword candidate set which is a set of keyword candidates corresponding to each class; and
    generate a keyword set corresponding to each class, from the keyword candidate set corresponding to each class, based on a relationship between the keywords included in the keyword candidate sets,
    wherein the one or more processors select an optimum keyword candidate from the keyword candidate set based on a relationship between the keywords belonging to different classes and a relationship between the keywords belonging to a same class, and include the optimum keyword in the keyword set, and
    wherein the one or more processors select, from the keyword candidates belonging to each class, the keyword candidate having a lowest degree of similarity to the keywords belonging to a different class and having a lowest degree of similarity to other keywords belonging to the same class.

2. The information processing device according to claim 1, wherein the one or more processors are further configured to classify the target data to one of the multiple classes using the keyword sets.

3. The information processing device comprising:
    a memory configured to store instructions; and
    one or more processors configured to execute the instructions to:
    acquire multiple classes to which target data is classified;
    generate a keyword candidate set which is a set of keyword candidates corresponding to each class; and
    generate a keyword set corresponding to each class, from the keyword candidate set corresponding to each class, based on a relationship between the keywords included in the keyword candidate sets, wherein the one or more processors select an optimum keyword candidate from the keyword candidate set based on a relationship between the keywords belonging to different classes and a relationship between the keywords belonging to a same class, and include the optimum keyword in the keyword set, wherein the one or more processors add the keyword candidate to the keyword set in an order from the keyword candidate having a highest total score of a first to third scores, among the keyword candidates belonging to each class, wherein the first score becomes larger as the degree of similarity between the keyword candidate and the class to which the keyword candidate belongs is higher, wherein the second score becomes larger as the degree of similarity between the keyword candidate and the keyword belonging to a class different from the keyword candidate is lower, and wherein the third score becomes larger as the degree of similarity between the keyword candidate and another keyword belonging to the same class as the keyword candidate is lower.

4. The information processing device according to claim 3, wherein the one or more processors select, for each class, a predetermined number of keyword candidates in an order from the keyword candidate having a highest total score, and add the selected keyword candidates to the keyword set corresponding the class.

5. The information processing device according to claim 3, wherein the one or more processors select the keyword candidates in an order from the keyword candidate having the highest total score in all the classes, and add the keyword candidates to the keyword set corresponding to the class.

6. An information processing method executed by a computer, comprising:

acquiring multiple classes to which target data is classified;

generating a keyword candidate set which is a set of keyword candidates corresponding to each class; and generating a keyword set corresponding to each class, from the keyword candidate set corresponding to each class, based on a relationship between the keywords included in the keyword candidate set wherein the generating a keyword set selects an optimum keyword candidate from the keyword candidate set based on a relationship between the keywords belonging to different classes and a relationship between the keywords belonging to a same class, and include the optimum keyword in the keyword set, and wherein the generating a keyword set selects, from the keyword candidates belonging to each class, the keyword candidate having a lowest degree of similarity to the keywords belonging to a different class and having a lowest degree of similarity to other keywords belonging to the same class.

7. A non-transitory computer-readable recording medium recording a program, the program causing a computer to execute the information processing method according to claim 6.

* * * * *